United States Patent [19]

Noji et al.

[11] Patent Number: 5,885,385
[45] Date of Patent: Mar. 23, 1999

[54] PNEUMATIC TIRE WITH SIDEWALL REINFORCING RUBBER LAYER

[75] Inventors: Hikomitsu Noji; Masaki Noro; Yasujiro Daisho; Issey Nakakita, all of Hiratsuka, Japan

[73] Assignee: The Yokohama Rubber Co., LTD., Tokyo, Japan

[21] Appl. No.: 974,503

[22] Filed: Nov. 19, 1997

Related U.S. Application Data

[62] Division of Ser. No. 650,515, May 17, 1996, abandoned.

[30] Foreign Application Priority Data

May 23, 1995 [JP] Japan ................................ 7-124033

[51] Int. Cl.$^6$ ............... B60C 9/00; B60C 13/00; B60C 15/00; B60C 15/06
[52] U.S. Cl. .................. 152/458; 152/525; 152/526; 152/528; 152/532; 152/539; 152/541; 152/554; 152/555
[58] Field of Search ................. 152/525, 555, 152/539, 541, 543, 546, 547, 532, 458, 554, 526, 528

[56] References Cited

U.S. PATENT DOCUMENTS 5,267,595  12/1993  Lampe ................................ 152/525

FOREIGN PATENT DOCUMENTS 1-278805  11/1989  Japan ................................ 152/525
6-092108  4/1994  Japan ................................ 152/532
6-255321  9/1994  Japan ................................ 152/555

OTHER PUBLICATIONS

*Mechanics of Pneumatic Tires*, ed. Samuel Clark: U.S. Department of Transportation, pp. 25–27., Aug., 1981.

Primary Examiner—Adrienne C. Johnstone
Attorney, Agent, or Firm—Nikaido, Marmelstein, Murray & Oram LLP

[57] ABSTRACT

At least one reinforcing rubber layer is provided in the part of each of two side wall portions which is on the outer side of a carcass layer. The outer circumferential end portions of the reinforcing rubber layers extend to positions in which they are disposed between the end portions of the innermost belt layer and the corresponding portions of the carcass layer, while the inner circumferential end portions of these rubber layers extend inward in the radial direction of the tire so as to overlap the bead fillers in positions on the outer sides of the end portions of the carcass layer in the widthwise direction of the tire. A 100% modulus at 100° C. of the rubber constituting the reinforcing rubber layers is not higher than that of the rubber of the belt layers, and a dynamic elastic modulus at 20° C. of the former rubber in the range of 10–40 MPa. The thickness of the portions of the reinforcing rubber layers which are between the edges of the innermost belt layer and the outer circumferential ends of the bead fillers is set securely to not less than 1.00 mm, and the thickness of the parts of the side wall portions which are on the tire outer sides of the reinforcing rubber layers also not less than 1.00 mm.

6 Claims, 2 Drawing Sheets

PNEUMATIC TIRE WITH SIDEWALL REINFORCING RUBBER LAYER

This application is a division of application Ser. No. 08/650,515 filed May 17, 1996, now abandoned.

BACKGROUND OF THE INVENTION

This invention relates to a pneumatic tire, and more particularly to a pneumatic tire for, especially, a passenger car, which tire is capable of improving the steering stability thereof while maintaining the durability of belt layers at a level equal to that of the durability of a belt layer in a conventional pneumatic tire, without causing an increase in the weight of the tire.

Conventional pneumatic tires for a passenger car include, for example, a tire shown in FIG. 3. In this pneumatic tire, belt edge cushion rubber layers 14 are disposed between both end portions of an innermost belt layer 12a out of a plurality of belt layers 12 buried in a tread portion 11 and a carcass layer 13. Second fillers 19 are provided the parts of side wall portions 18 which are on the outer sides of both end portions 13a of the carcass layer 13 which extend into the radially outer portions of the tire. The end portions 13a are folded from the inner side of the tire to the outer side thereof around bead cores 16 buried in left and right bead portions 15, in such a manner that the folded parts of the carcass sandwich bead fillers 17 joined to outer circumferences of the bead cores 16. The second fillers 19 are provided so that inner circumferential portions of the second fillers 19 overlap the bead fillers 17 in the widthwise direction of the tire.

The belt edge cushion rubber layers 14 are provided to lessen the stress in the edges of the belt layers and improve the durability of the belt edge portions. The second fillers 19 are provided to heighten the rigidity (especially, the rigidity thereof in the circumferential direction of the tire) of the side wall portions 18 and improve steering stability. The belt edge cushion rubber layers 14 and second fillers 19 are generally formed of different kinds of rubber due to their different purposes.

Since it has become necessary in recent years that a vehicle has a higher performance and secures a sufficiently high safety, a pneumatic tire of the above-described construction must have a higher steering stability. Moreover, in order to follow the tendency in recent years for a vehicle to have decreased weight, it has been strongly demanded that the steering stability of a tire be improved with the durability of a belt layers being maintained at a level equal to that of the durability thereof in a conventional tire, without causing an increase of the weight of the tire.

SUMMARY OF THE INVENTION

An object of the present invention is to provide a pneumatic tire capable of improving steering stability while avoiding an increase in the weight thereof and maintaining the durability of a belt layer at a level equal to that of the durability thereof in a conventional pneumatic tire.

Another object of the present invention is to provide a pneumatic tire capable of reducing the generation of scraps during the steps of manufacturing the tire, and improving the productivity thereof by reducing the number of the constituent parts thereof and the number of manufacturing steps.

To achieve these objects, the present invention provides a pneumatic tire, wherein both end portions of at least one carcass layer are folded from an inner side of the tire to an outer side thereof around bead cores provided in left and right bead portions and extended to radially outer portions of the tire so as to sandwich bead fillers joined to outer circumferences of the bead cores. A plurality of belt layers are buried in the part of a tread portion which is on the outer circumferential side of the carcass layer. The invention is characterized in that at least one reinforcing rubber layer is buried in each of the parts of the two side wall portions which are on the outer side of the at least one carcass layer, with outer circumferential end portions of the reinforcing rubber layers being extended up to positions between end portions of an innermost belt layer and the carcass layer. The inner circumferential end portions of the reinforcing rubber layers are extended to radially inner side portions of the tire so as to overlap the bead fillers in the widthwise direction of the tire in positions on the outer sides of the end portions of the carcass layer. A 100% modulus at 100° C. of the rubber constituting the reinforcing rubber layers is set not higher than the 100% modulus of the rubber of the belt layers. A dynamic elastic modulus at 20° C. of the rubber constituting the reinforcing rubber layers is set in the range of 10–40 MPa. The thickness of the portions of the reinforcing rubber layers which are between the edges of the innermost belt layer and the outer circumferential ends of the bead fillers is set to not less than 1.0 mm. The thickness of the parts of the side wall portions which are on the tire outer sides of the reinforcing rubber layers is set to not less than 1.0 mm.

The present invention provides another pneumatic tire, wherein both end portions of at least one carcass layer are folded from an inner side of the tire to an outer side thereof around bead cores provided in left and right bead portions and extended to radially outer portions of the tire so as to sandwich bead fillers joined to outer circumferences of the bead cores. A plurality of belt layers are buried in the part of a tread portion which is on the outer circumferential side of the carcass layer. The invention is characterized in that at least one reinforcing rubber layer is buried in each of the parts of the two side wall portions which are on the outer side of the at least one carcass layer, with outer circumferential end portions of the reinforcing rubber layers being extended up to positions between end portions of an innermost belt layer and the carcass layer. The inner circumferential end portions of the reinforcing rubber layers are extended to radially inner side portions of the tire so that these end portions overlap the bead fillers in the widthwise direction of the tire in positions on the outer sides of the end portions of the carcass layer. The reinforcing rubber layers are formed of rubber having short fibers oriented in the same diagonal direction with respect to the circumferential direction of the tire. A 100% modulus at 100° C. in the direction of orientation of the short fibers in the same rubber is set not higher than that of the rubber of the belt layers. The thickness of the portions of the reinforcing rubber layers which are between the edges of the innermost belt layer and the outer circumferential ends of the bead fillers is set to not less than 1.0 mm. The thickness of the parts of the side wall portions which are on the tire outer sides of the reinforcing rubber layers is set to not less than 1.0 mm.

As described above, the present invention is constructed by disposing the outer circumferential end portions of the reinforcing rubber layers respectively positioned in the two side wall portions between both end portions of the innermost belt layer and the carcass layer, and disposing the inner circumferential end portions of the reinforcing rubber layers so that these end portions overlap the bead fillers in positions on the outer sides of the end portions of the carcass layer with the physical properties of the rubber which constitute the reinforcing rubber layers set in the above-mentioned ranges. Therefore, the actions identical with those of a conventional belt edge cushion rubber layers which improve the durability of the belt edge portions and those of conventional second fillers which improve the rigidity in the circumferential direction of the tire of the side wall portions can be made by the reinforcing rubber layers. Moreover, in the parts of the side wall portions which are between the edges of the innermost belt layer and the outer circumferential ends of the bead fillers, the reinforcing rubber layers are made of rubber having a hardness which is higher than that of the rubber used generally for the side wall portions. The thickness of the rubber layer is set to not less than 1.0 mm. This enables the rigidity of the side wall portions to be further improved. Accordingly, a high steering stability can be obtained with the durability of the belt layers maintained at a level equal to that of the durability of conventional belt layers.

In addition, even when the reinforcing rubber layers are provided in the side wall portions, the thickness of the parts of the side wall portions which are on the tire outer sides of the reinforcing rubber layers can be set smaller by a level corresponding to that of the thickness of the reinforcing ribber layers. Therefore, the side wall portions do not become thicker. This does not cause an increase in the weight of the tire.

Since the belt edge cushion rubber layer and second filler which are provided in a conventional pneumatic tire can be formed into one part comprising a reinforcing rubber layer, the number of the constituent parts of the tire can be reduced. As a result, the generation of scraps during the steps of manufacturing these parts can be reduced owing to the decrease in the tire manufacturing steps, and the productivity of the tire can be improved.

Since the inner circumferential end portions of the reinforcing rubber layers are extended inward in the radial direction of the tire in the positions on the outer sides of the end portions of the carcass layer, the edges of the folded portions of the carcass layer can be covered completely with the reinforcing rubber layers. Accordingly, the positions of the edges of both end portions of the carcass layer can be set freely without taking into consideration (for keeping the durability of the tire excellent) of the disposition of the edges of the tire-forming members adjacent to the edges of the carcass layer.

In the case where a tire is molded by putting a rubber portion, which constitutes a tread portion, over the outer circumferential end portions of rubber portions, which constitute side wall portions, the reinforcing rubber layers can be extrusion molded as products unitary with the rubber portions constituting the side wall portions. Therefore, the rubber portions constituting the side wall portions and the reinforcing rubber layers can be combined together in a green tire assembling step. Namely, a reinforcing rubber layer setting step need not be carried out separately, so that the productivity of the tire can be further improved.

The same operational effect as mentioned above can also be obtained by using rubber containing short fibers having directivity for the production of the reinforcing rubber layers, and setting the physical properties and thickness of the same rubber layers in the above-mentioned ranges.

BRIEF DESCRIPTIONS OF THE DRAWINGS

DESCRIPTION OF THE PREFERRED EMBODIMENTS

Figure 1:
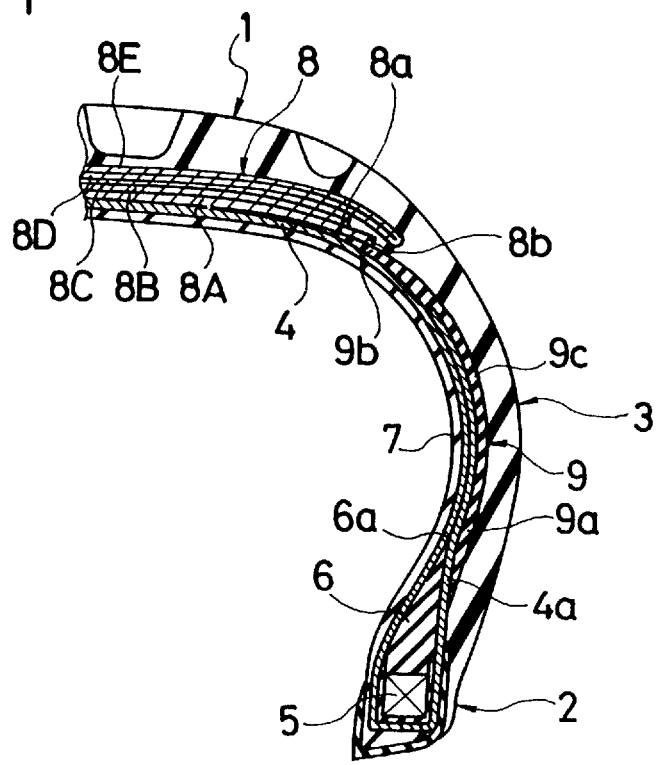
FIG. 1 is a sectional view showing a principal portion of an example of the pneumatic tire according to the present invention which is taken along the meridian of the tire.

Referring to FIG. 1, a reference numeral 1 denotes a tread portion, 2 a bead portion, and 3 a side wall portion. Left and right side wall portions 3 are provided so as to be joined to left and right bead portions 2 and extended outward in the radial direction of the tire. Between the left and right side wall portions 3, a tread portion 1 extending in the circumferential direction of the tire is provided.

In an inner portion of the tire, one carcass layer 4 is provided. In the left and right bead portions 2, annular bead cores 5 are buried, and cross-sectionally triangular bead fillers 6 are joined to the outer circumferences of the bead cores 5. Both end portions 4a of the carcass layer 4 are folded around the bead cores 5 from the inner side of the tire to the outer side thereof, sandwich the bead fillers 6 and extend in the radially outward direction of the tire beyond positions which determine a maximum width of the tire.

One inner liner layer 7 is provided on the inner side of the carcass layer 4. Five belt layers 8 are buried in the part of the tread portion 1 which is on the outer circumferential side of the carcass layer. The innermost No. 1 belt layer 8A is formed to a width larger than that of Nos. 2 and 3 belt layers 8B, 8C laminated on the outer circumference thereof. The Nos. 4 and 5 belt layers 8D, 8E on the outer side of the No. 3 belt layer are formed to a width larger than that of the innermost belt layer 8A. Both edge portions of the Nos. 4 and 5 belt layers 8D, 8E are connected together vertically. The reinforcing cords buried in the Nos. 4 and 5 belt layers 8D, 8E are folded back so that the end portions of these cords are not exposed to the outside of the edges of the belt layers.

In the pneumatic tire of the above-described construction according to the present invention, one reinforcing rubber layer 9 formed in a ring extending in the circumferential direction of the tire is buried in each of the parts of both side all portions 3 which are on the outer side of the carcass layer 4. The reinforcing rubber layers 9 disposed so as to contact the carcass layer 4 extend up to positions in which the outer circumferential end portions 9b are interposed between the end portions 8a of the innermost layer 8A out of the belt layers 8 and the corresponding portion of the carcass layer 4. The inner circumferential end portions 9a extend inward in the radial direction of the tire up to the outer circumferential end portions of the bead fillers 6 so that these end portions 9a overlap the bead fillers 6 in positions, which are on the outer sides of the end portions 4a of the carcass layer 4, in the widthwise direction of the tire.

A 100% modulus at 100° C. of the rubber constituting the reinforcing rubber layers 9 is set not higher than that of the rubber of the belt layers 8. A dynamic elastic modulus at 20° C. of the former rubber is set in the range of 10–40 MPa.

The reinforcing rubber layers 9 are formed so that the thickness of their intermediate portions 8c, which are positioned between the edges 8b of both end portions 8a of the innermost belt layer 8A and the outer circumferential ends 6a of the bead fillers 6, becomes not less than 1.0 mm. The thickness of the parts of the side wall portions 3 which are on the outer sides of the reinforcing rubber layers 9 is maintained at not less than 1.0 mm securely and reduced by a level corresponding to the thickness of the reinforcing rubber layers 9 provided on the inner sides of the mentioned parts of the side wall portions. The thickness of the side wall portions 3 as a whole provided therein with the reinforcing rubber layers 9 is set equal to that of the side wall portions of a conventional tire.

The inner circumferential end portions 9a of the reinforcing rubber layers 9 provided in both side wall portions 3 are arranged so as to overlap the bead fillers 6 in positions on the outer sides of the end portions 4a of the carcass layer 4, while the outer circumferential end portions 9b of the reinforcing rubber layers are provided between both end portions 8a of the innermost belt layer 8A and the corresponding portions of the carcass layer 4, the physical properties of the rubber constituting the reinforcing rubber layers 9 being set in the above mentioned ranges. Accordingly, the inner circumferential end portions 9a work in the same manner as conventional second fillers which improve the rigidity of a tire with respect to the circumferential direction thereof, while the outer circumferential end portions 9b work in the same manner as conventional belt edge cushion rubber layers which improve the durability of the belt edge portions.

The intermediate portions 9c of the reinforcing rubber layers 9, which comprise rubber the rigidity of which is higher than that of the rubber used generally for the side wall portions, are disposed in the parts of the side wall portions 3 which are between the edges 8b of the innermost belt layer 8A and the outer circumferential ends 6a of the bead fillers 6 so that the intermediate portions 9c secure a thickness of not less than 1.0 mm. Therefore, the intermediate portions 9c work in cooperation with the inner circumferential end portions 9a and outer circumferential end portions 9b and can further improve the rigidity of the side wall portions 3 with respect to the circumferential direction of the tire. This enables the durability of the belt layers to be maintained at a level equal to that of the durability of a conventional belt layer, and the steering stability to be further improved.

Moreover, since the thickness of the side wall portions 3 can be set to a level equal to that of the thickness of conventional side wall portions even when the reinforcing rubber layers 9 are provided therein, the weight of the tire does not increase.

Since the belt edge cushion rubber layer and second filler which are provided independently in a conventional tire can be formed into one reinforcing rubber layer, the number of the constituent members of the tire according to the present invention can be reduced. Accordingly, the generation of scraps during the tire manufacturing steps can be reduced owing to a decrease in the manufacturing steps (the wasteful use of materials is minimized), and the productivity of the tire can be improved.

When a tire of a so-called TOS construction (Tread Over Sidewall Construction) is molded by putting rubber for forming a tread portion 1 over outer circumferential end portions of the rubber for forming side wall portions 3, the reinforcing rubber layers 9 can be extrusion molded with rubber portions which are to form the side wall portions 3 into unitary products. Therefore, the rubber portions constituting the side wall portions and the reinforcing rubber layers can be combined together in a green tire assembling step. Namely, a reinforcing rubber layer setting step need not be carried out separately, so that the productivity of the tire can be further improved.

When a 100% modulus at 100° C. of the rubber constituting the reinforcing rubber layers 9 is higher than that of the rubber of the belt layers 8, it becomes difficult to soften the stress of the shearing strain of the belt edge portions, so that the durability of the belt layers lowers. When the separation of edges of the belt layers occur, the temperature in the vicinity of these edges is high. Accordingly, a 100% modulus at a temperature of 100° C. is employed as a typical value.

The 100% modulus at 100° C. of the rubber of the reinforcing rubber layers 9 is preferably set in the range of 1.5–4.5 MPa. When the 100% modulus is lower than 1.5 MPa, it is difficult to secure a sufficiently high rigidity of the side wall portions. Conversely, when the 100% modulus exceeds 4.5 MPa, the durability of the belt layers lowers since the rigidity of the reinforcing rubber layers becomes excessively high.

When the dynamic elastic modulus at 20° C. of the rubber constituting the reinforcing rubber layers 9 is lower than 10 MPa, the rigidity of the side wall portions cannot be increased effectively. Conversely, when this dynamic elastic modulus is higher than 40 MPa, the load durability and riding comfort lower.

When the thickness of the reinforcing rubber layers 9 is less than 1.0 mm, it becomes difficult to secure a sufficiently high rigidity of the side wall portions. An upper limit level of this thickness can be set suitably in the range which permits the thickness of the side wall portions 3, which are on the outer sides of the reinforcing rubber layers 9, to be set to not less than 1.0 mm securely.

When the thickness of the side wall portions 3 which are on the outer sides of the reinforcing rubber layers 9 is less than 1.0 mm, ozone cracks occur to cause the durability of the side wall portions 3 to lower. The sum of the thickness of the parts of the reinforcing rubber layers 9 which are between the edges 8b of the innermost belt layer 8A and the outer circumferential ends 6a of the bead fillers 6 and that of the side wall portions 3 on the outer sides thereof can be generally set to not more than 10 mm, though it differs depending upon the kind of the tire.

Figure 2:
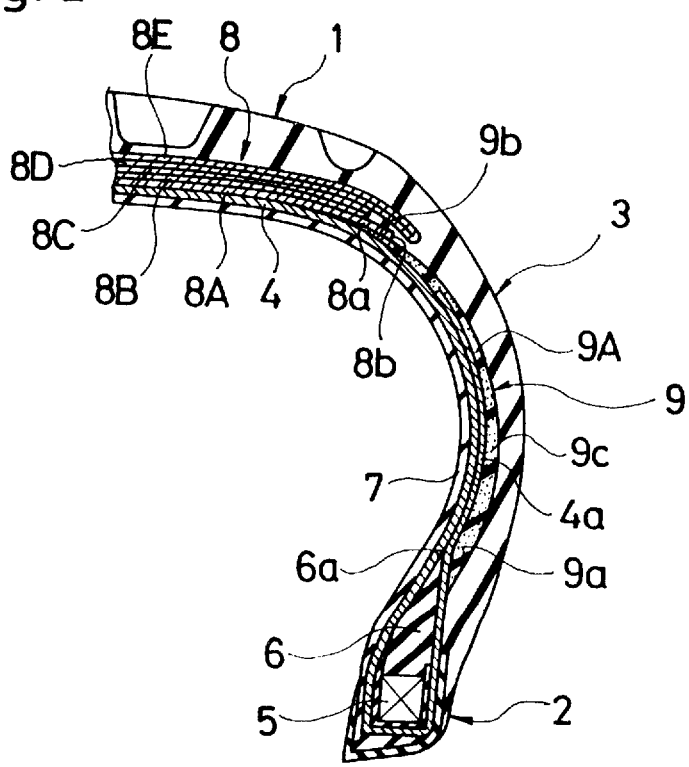
FIG. 2 is a sectional view showing a principal portion of another example of the pneumatic tire according to the present invention which is taken along the meridian of the tire.

FIG. 2 shows another example of the pneumatic tire according to the present invention. In this mode of embodiment, the above-mentioned reinforcing rubber layers 9 are formed out of rubber containing short fibers 9A orientated in the same diagonal direction with respect to the circumferential direction of the tire. The 100% modulus at 100° C. in the direction of orientation of the short fibers in the rubber is set not more than that of the rubber of the belt layers 8. The thickness of the intermediate portions 9c of the reinforcing rubber layers 9 which are between the edges 8b of the innermost belt layer 8A and the outer circumferential ends 6a of the bead fillers 6 and that of the side wall portions 3 on the outer sides thereof are the same as those mentioned above. Forming the reinforcing rubber layers 9 in this manner also enables the same effect as mentioned above to be obtained.

The 100% modulus at 100° C. in the direction of the orientation of the short fibers of the rubber constituting the reinforcing rubber layers 9 can be set in the range of 1.5–4.5 MPa just as in the above described embodiment.

The compounding ratio of the short fibers 9A contained in the reinforcing rubber layers 9 is preferably set to 1–15 parts by weight with respect to 100 parts by weight of rubber. When this compounding ratio is less than 1 part by weight, the rigidity of the side wall portions cannot be heightened, so that it becomes difficult to improve the steering stability. Conversely, when the compounding ratio exceeds 15 parts by weight, the rigidity of the reinforcing rubber layers becomes too high, so that the durability of the belt layers and riding comfort lower.

The angle of orientation of the short fibers 9A can be set in the range of 45°±15° on both sides in the circumferential direction of the tire with respect to the radial direction thereof. When this angle is out of the mentioned range, it becomes difficult to have both the steering stability improving effect and the riding comfort.

For example, polyamide fibers and glass fibers can preferably used as the short fibers 9A referred to above. The short fibers 9A have a length in the range of 10–5000 μm.

In the above-described modes of embodiments of the present invention, one reinforcing rubber layer 9 is provided in each of the two side wall portions 3, and not less than one layer can also be provided in accordance with the thickness thereof and a required degree of reinforcement thereof. In these modes of embodiments, pneumatic tires provided with five belt layers 8 and one carcass layer 4 are described but the present invention is not limited to these tires. It is needless to say that the present invention can be suitably used even when the pneumatic tire comprises a tire provided with not less than one carcass layer 4 and not less than two belt layers.

Figure 3:
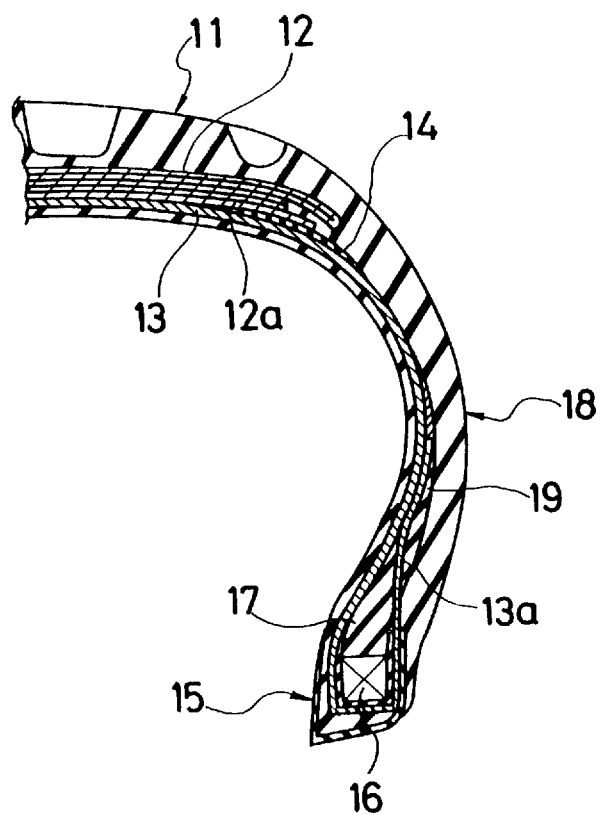
FIG. 3 is a sectional view showing a principal portion of a conventional pneumatic tire which is taken along the meridian of the tire.

EXAMPLE 1:

Pneumatic tires 1–3 according to the present invention and Comparative pneumatic tires 1 and 2 all of which had the construction shown in FIG. 1 with their 100% moduli at 100° C. of the rubber constituting the reinforcing rubber layers set variously as shown in Table 1, and a Conventional pneumatic tire having the construction shown in FIG. 3 were manufactured. The size of all of these tires is 255/40 ZR17.

The dynamic elastic modulus at 20° C. of the rubber of the reinforcing rubber layers in the tires according to the present invention and comparative tiers is substantially 14 MPa. The thickness of the intermediate portions 9c of the reinforcing rubber layers is 1.5 mm. The thickness of the cross-sectionally narrowest parts of the regions of the side wall portions which are on the outer sides of the reinforcing rubber layers is 1.5 mm. The index values in the table are values of the 100% modulus at 100° C. of the rubber of the reinforcing rubber layers based on 100 which represent the same modulus of the rubber of the belt layers. The smaller values indicate lower hardness of the rubber.

Pneumatic tires 4–6 according to the present invention and Comparative pneumatic tires 3 and 4 all of which had the construction shown in FIG. 1 with their dynamic elastic moduli at 20° C. of the rubber constituting the reinforcing rubber layers varied as shown in Table 2 were manufactured. The tire forming conditions (except the dynamic elastic modulus at 20° C.) were the same as mentioned above except that the 100% modulus at 100° C. of the rubber of the reinforcing rubber layers was set to around 4.0 MPa.

Pneumatic tires 7 and 8 according to the present invention and Comparative pneumatic tires 5 and 6 all of which had the construction shown in FIG. 1 with the thickness A of the intermediate portions 9c of the reinforcing rubber layers set variously as shown in Table 3 were manufactured. The tire forming conditions (except the thickness of the reinforcing rubber layers) were the same as in the case of the test tires shown in Table 1 except that the 100% modulus at 100° C. of the rubber of the reinforcing rubber layers was set of 4.1 MPa. Table 3 also shows the thickness B of the parts of the side wall portions which are on the outer sides of the reinforcing rubber layers, which varies in accordance with the variation of the thickness A of the reinforcing rubber layers. This thickness B was measured at a buttress portion which extended from a position in which the thickness of the outer part of the side wall portion was minimal with the cross-sectional width of the tire made maximal to the relative shoulder portion of the tire. The sum of the thickness A of the reinforcing rubber layer and that B of the outer parts of the side wall portions is constant.

These test tires were subjected to evaluation tests for determining the rigidity of side wall portions, durability of belt layers, weight of tires and steering stability under the following measuring conditions to obtain results shown in Tables 1–3. Rigidity of the side wall portions:

Each test tire was set on a rim of a size of 17x9J, and the air pressure therein was set to 250 kPa. The tread surface of each test tire is fixed on the circumference with a displacement force applied to the rim in the vertical direction, surface direction and rotational direction to measure the stress. In these tests, the rigidity of the side wall portions in the circumferential direction of the tires which had great influence upon the steering stability on a circuit course was determined. The results were evaluated by using index values based on 100 which represented the rigidity of the side wall portions of a conventional tire. The larger values indicate higher rigidity of the side wall portions. Durability of the belt layers:

Each test tire was set on a rim having a size of 17x9J, and the air pressure was set to 250 kPa. The resultant tire was mounted on a drum test machine, and a load of 5 kN was imparted thereon. The length of a period of time to the occurrence of separation of an edge of the belt layers and the destruction of the tire was measured. The results are shown by index values based on 100 which represents the length of this period of tire concerning a conventional tire. The larger values indicate higher durability of the belt layers. Weight of the tires:

The Freight of each test tire was measured, and the results were evaluated by using index values based on 100 which represented the weight of a conventional tire. The larger values indicate larger weight. Steering stability:

Each test tire was set on a rim having a size of 17x9J, and the air pressure was set to 250 kPa. The resultant tire was attached to a passenger car with a 2.6 liter engine, and this passenger car was made run on a circuit course to subject the tire to a driver's feeling test and evaluate the steering stability. The results were shown by numerical values based on zero which represented the steering stability concerning a conventional tire. The larger numerical values indicate higher steering stability.

TABLE 1

|  | Comparative Tire 1 | Tire 1 of the Invention | Tire 2 of the Invention | Tire 3 of the Invention | Comparative Tire 2 | Conventional Tire |
|---|---|---|---|---|---|---|
| Index Value | 22 | 33 | 89 | 100 | 111 | 44 |
| Modulus (MPa) | 1.0 | 1.5 | 4.0 | 4.5 | 5.0 | 2.0 |

TABLE 1-continued

|  | Comparative Tire 1 | Tire 1 of the Invention | Tire 2 of the Invention | Tire 3 of the Invention | Comparative Tire 2 | Conventional Tire |
|---|---|---|---|---|---|---|
| Rigidity of the Side Wall Portions | 100 | 106 | 110 | 112 | 113 | 100 |
| Durability | 100 | 102 | 101 | 99 | 91 | 100 |
| Weight | 100 | 100 | 100 | 100 | 100 | 100 |
| Steering Stability | 0 | 1 | 1 | 1 | 1 | 0 |

TABLE 2

|  | Comparative Tire 3 | Tire 4 of the Invention | Tire 5 of the Invention | Tire 6 of the Invention | Comparative Tire 4 |
|---|---|---|---|---|---|
| Dynamic Elastic Modulus | 4 | 10 | 25 | 40 | 42 |
| Rigidity of the Side Wall Portions | 102 | 107 | 126 | 132 | 132 |
| Durability | 106 | 107 | 107 | 100 | 95 |
| Weight | 100 | 100 | 100 | 100 | 100 |
| Steering Stability | 0 | 1 | 2 | 3 | 3 |

(Note)
The unit of the dynamic elastic modulus is MPa.

TABLE 3

|  | Comparative Tire 5 | Tire 7 of the Invention | Tire 8 of the Invention | Comparative Tire 6 |
|---|---|---|---|---|
| Thickness A (mm) | 0.5 | 1.0 | 2.0 | 2.5 |
| Thickness B (mm) | 2.5 | 2.0 | 1.0 | 0.5 |
| Rigidity of the Side Wall Portions | 103 | 108 | 123 | 130 |
| Durability | 106 | 106 | 102 | 90 |
| Weight | 100 | 100 | 100 | 100 |
| Steering Stability | 0 | 1 | 2 | 3 |

As is clear from Tables 1–3, the tires according to the present invention having a 100% modulus at 100° C. of the rubber of the reinforcing rubber layers set not lower than that of the rubber of the belt layers, a dynamic elastic modulus at 20° C. set in the range of 10–40 MPa, a thickness of the portions of the reinforcing rubber layers which are between the edges of the innermost belt layer and the outer circumferential ends of the bead fillers set to not less than 1.0 mm, and a thickness of the parts of the side wall portions which are on the outer sides of the reinforcing rubber layers set to not less than 1.0 mm do not cause an increase in the weight thereof, and enable the steering stability to be improved with the durability of the belt layers maintained at a level substantially equal to that of the durability of the belt layers in a conventional tire.

It is also understood from these tables that the 100% modulus at 100° C. of the reinforcing rubber layers should be set to 1.5 MPa.

EXAMPLE 2

Pneumatic tires 9–11 according to the present invention and Comparative pneumatic tires 7 and 8 all of which had the construction shown in FIG. 2 with the 100% modulus at 100° C. in the direction of orientation of the short fibers in the reinforcing rubber layers set variously as shown in Table 4 were manufactured. The size of these tires is 255/50 ZR17.

In each test tire, the thickness of the intermediate portions 9c of the reinforcing rubber layers is 1.5 mm, and a minimum thickness of the parts of the side wall portions which are on the outer sides of the reinforcing rubber layers 1.5 mm. The short fibers used comprise short polyamide fibers the average diameter and average length of which are 1 μm and 100–2000 μm respectively. Five parts by weight of short fibers were mixed with 100 parts by weight of rubber, and the orientation angle of the fibers is 45°, i.e., the fibers incline at this angle in the rotational direction of the tire with respect to the radial direction thereof. The index values in the tables are values of 100% modulus at 100° C. in the direction of orientation of the short fibers in the rubber of the reinforcing rubber layers based on 100 which represents the same modulus of the rubber of the belt layers.

Pneumatic tires 12 and 13 according to the present invention and Comparative tires 9 and 10 all of which had the construction shown in FIG. 2 with the thickness A of the intermediate portions 9c of the reinforcing rubber layers set variously as shown in Table 5 were manufactured. The tire forming conditions (except the thickness of the reinforcing rubber layers) were the same as in the case of the test tires shown in Table 4 except that the 100% modulus at 100° C. in the direction of orientation of the short fibers in the reinforcing rubber layers was set to about 4.0 MPa. Table 5 also shows the thickness B of the parts of the side wall portions which are on the outer sides of the reinforcing rubber layers, which thickness B varies in accordance with the variation of the thickness A of the same rubber layers. The position in which this thickness B was measured is the same as in Example 1 described above.

These test tires were subjected to evaluation tests for the rigidity of the side wall portions, durability of the belt layers, weight of the tires and steering stability under the measuring conditions shown in Example 1, and a riding comfort evaluation test under the following measuring conditions. The results shown in Tables 4 and 5 were obtained. Riding comfort:

Each test tire was set on a rim having a size of 17x9j, and the air pressure was set to 250 kPa. The resultant tire was attached to a 2.6 liter engine passenger car, and this passenger car was made run on a test course to subject the tire to a driver's feeling test. The results are shown by index values based on 100 which represents the riding comfort of a conventional tire. The larger values indicate better riding comfort.

It is also understood that the 100% modulus at 100° C. in the direction of orientation of the short fibers in the reinforcing rubber layers should be set in the range of 1.5–4.5 MPa.

EXAMPLE 3

Test tires 1–5 in which the compounding ratio of short fibers was varied as shown in Table 6 and test tires 6–10 in

TABLE 4

|  | Comparative Tire 7 | Tire 9 of the Invention | Tire 10 of the Invention | Tire 11 of the Invention | Comparative Tire 8 |
| --- | --- | --- | --- | --- | --- |
| Index Value | 22 | 33 | 89 | 100 | 111 |
| Modulus (MPa) | 1.0 | 1.5 | 4.0 | 4.5 | 5.0 |
| Rigidity of the Side Wall Portions | 100 | 106 | 110 | 112 | 113 |
| Durability | 100 | 102 | 101 | 100 | 91 |
| Weight | 100 | 100 | 100 | 100 | 100 |
| Steering Stability | 0 | 1 | 1 | 1 | 1 |
| Riding Comfort | 100 | 103 | 105 | 103 | 100 |

TABLE 5

|  | Comparative Tire 9 | Tire 12 of the Invention | Tire 13 of the Invention | Comparative Tire 10 |
| --- | --- | --- | --- | --- |
| Thickness A (mm) | 0.5 | 1.0 | 2.0 | 2.5 |
| Thickness B (mm) | 2.5 | 2.0 | 1.0 | 0.5 |
| Rigidity of the Side Wall Portions | 103 | 108 | 130 | 135 |
| Durability | 106 | 106 | 102 | 90 |
| Weight | 100 | 100 | 100 | 100 |
| Steering Stability | 0 | 1 | 2 | 2 |
| Riding Comfort | 100 | 101 | 101 | 95 |

It is understood clearly from Tables 4 and 5 that the present invention obtained by forming the reinforcing rubber layers out of rubber containing short fibers orientated in the same diagonal direction with respect to the circumferential direction of the tire, setting the 100% modulus at 100° C. in the direction of orientation of the short fibers not more than that of the rubber of the belt layers, setting the thickness of the portions of the reinforcing rubber layers which are between the edges of the innermost belt layer and the outer circumferential ends of the bead fillers to not less than 1.0 mm, and setting the thickness of the parts of the side wall portions which are on the outer side of the reinforcing rubber layers to not less than 1.0 mm can improve the steering stability while maintaining the durability at a level equal to that of the durability of a conventional tire without causing an increase in the weight. It is also understood that the riding comfort does not lower even when the rigidity of the side wall portions is increased.

which the angle of orientation of the short fibers was varied with respect to the radial direction of the tires as shown in Table 7 were manufacture to the construction shown in FIG. 2. The size of the tires was the same as that of the tire of Example 2.

The other tire-forming conditions for these test tires are the same as those for the test tires shown in Table 4 relative to Example 2 except that the 100% modulus at 100° C. in the direction of orientation of the short fibers in the rubber of the reinforcing rubber layers was set to about 4.0 MPa.

These test tires were subjected to evaluation tests for the rigidity of the side wall portions, durability of the belt layers, weight of the tires, steering stability and riding comfort under the above mentioned measuring conditions to obtain the results shown in Tables 6 and 7.

TABLE 6

|  | Test Tire 1 | Test Tire 2 | Test Tire 3 | Test Tire 4 | Test Tire 5 |
| --- | --- | --- | --- | --- | --- |
| Compounding Ratio | 0.5 | 1.0 | 10 | 15 | 20 |
| Rigidity of the Side Wall Portions | 104 | 109 | 125 | 130 | 140 |
| Durability | 100 | 100 | 100 | 100 | 85 |
| Weight | 100 | 100 | 100 | 100 | 100 |
| Steering Stability | 0 | 1 | 2 | 3 | 3 |
| Riding Comfort | 100 | 101 | 100 | 100 | 95 |

(Note)
The unit of the compounding ratio is part by weight.

TABLE 7

|  | Test Tire 6 | Test Tire 7 | Test Tire 8 | Test Tire 9 | Test Tire 10 |
| --- | --- | --- | --- | --- | --- |
| Angle (degree) | 20 | 30 | 45 | 60 | 70 |
| Rigidity of the Side Wall Portions | 103 | 109 | 119 | 100 | 94 |
| Durability | 102 | 101 | 101 | 101 | 101 |
| Weight | 100 | 100 | 100 | 100 | 100 |
| Steering Stability | 0 | 1 | 2 | 1 | 0 |
| Riding Comfort | 92 | 100 | 100 | 100 | 102 |

It is understood from Table 6 that the compounding ratio of the short fibers should be set to 1–15 parts by weight with respect to 100 parts by weight of rubber.

It is understood from Table 7 that the angle of orientation of the short fibers should be in the range of 45°±15° with respect to the radial direction of the tire.

According to the present invention described above, the outer circumferential end portions of the reinforcing rubber layers disposed in the two side wall portions are positioned between both end portions of the innermost belt layer and carcass layer, and the inner circumferential end portions of the reinforcing rubber layers are disposed so as to overlap the bead fillers in positions which are on the outer sides of the end portions of the carcass layer, the physical properties of the rubber of the reinforcing rubber layers being set in the above-mentioned ranges, whereby the reinforcing rubber layers can work in the same manner as the conventional belt edge cushion rubber layers, which improve the durability of belt edge portions, and the conventional second fillers, which secure the rigidity of the side wall portions. In the parts of the side wall portions which are between the edges of the innermost belt layer and the outer circumferential ends of the bead fillers, reinforcing rubber layers using rubber, the rigidity of which is generally higher than that of the rubber used for the side wall portions, are provided with the thickness thereof set to not less than 1.0 mm, so that the rigidity of the side wall portions can be further improved. Moreover, even when the reinforcing rubber layers are provided in the side wall portions, the thickness of the parts of the side wall portions which are on the outer sides of the reinforcing rubber layers may be reduced by a level corresponding to that of the thickness of the same rubber layers, and, therefore, the thickness of the side wall portions does not increase. Accordingly, it becomes possible to further improve the steering stability while maintaining the durability of the belt layers at the level of that of conventional belt layers without causing an increase in the weight of the tire.

Since each reinforcing rubber layer comprising one member can be substituted for the conventional separately disposed belt edge cushion rubber layer and second filler, the number of the constituent parts of the tire can be reduced. This enables the number of manufacturing steps to be reduced, the generation of scraps during the manufacturing steps to lower, and the productivity of the tire to be improved.

According to the present invention, the same effect as mentioned above can also be obtained even when the tire is formed by using rubber in which short fibers are orientated in the same direction for the reinforcing rubber layers, and setting the physical properties and thickness of the same rubber in the above-mentioned ranges.

What is claimed is:

1. A pneumatic tire, wherein both end portions of at least one carcass layer are folded from an inner side of said tire to an outer side thereof around bead cores provided in left and right bead portions and extended to radially outer portions of said tire so as to sandwich bead fillers joined to outer circumferences of said bead cores, a plurality of belt layers being buried in the part of a tread portion which is on the outer circumferential side of said at least one carcass layer, characterized in that:

both end portions of said at least one carcass layer extend beyond the portions of said tire which determine a maximum width of said tire up to outer parts of two side wall portions with respect to the radial direction of said tire, at least one reinforcing rubber layer being buried in each of the parts of said two side wall portions which are on the outer side of said at least one carcass layer, outer circumferential end portions of said reinforcing rubber layers being extended up to positions between end portions of an innermost belt layer and said at least one carcass layer, inner circumferential end portions of said reinforcing rubber layers being extended to radially inner side portions of said tire so as to overlap said bead fillers in the widthwise direction of said tire in positions on the outer sides of said end portions of said at least one carcass layer, said reinforcing rubber layers being formed out of rubber in which short fibers are oriented in the same diagonal direction with respect to the circumferential direction of said tire, a 100% modulus at 100° C. in the direction of orientation of said short fibers in said rubber being set not higher than that of the rubber of said belt layers, the thickness of each of the portions of said reinforcing rubber layers which are between the edges of said innermost belt layer and the outer circumferential ends of said bead fillers being set to not less than 1.0 mm, the thickness of each of the parts of said side wall portions which are on the tire outer sides of said reinforcing rubber layers being set to not less than 1.0 mm.

2. A pneumatic tire according to claim 1, wherein the 100% modulus at 100° C. in the direction of orientation of the short fibers in the rubber constituting said reinforcing rubber layers is 1.5–4.5 MPa.

3. A pneumatic tire according to claim 1, wherein 1–15 parts by weight of said short fibers are compounded with 100 parts by weight of rubber.

4. A pneumatic tire according to claim 1, wherein an angle of orientation of said short fibers is in the range of 45°±15° with respect to the radial direction of said tire.

5. A pneumatic tire according to claim 1, wherein said short fibers are selected from the group consisting of polyamide fibers and glass fibers.

6. A pneumatic tire according to claim 1, wherein said short fibers have a length in the range of from 10 to 5000 μm.

* * * * *